UNITED STATES PATENT OFFICE.

PHILIP B. HUNT, OF MINNEAPOLIS, MINNESOTA.

BAKING-POWDER.

SPECIFICATION forming part of Letters Patent No. 654,573, dated July 24, 1900.

Application filed June 21, 1900. Serial No. 21,124. (No specimens.)

*To all whom it may concern:*

Be it known that I, PHILIP B. HUNT, of the city of Minneapolis, county of Hennepin, State of Minnesota, have invented certain new and useful Improvements in Baking-Powders, of which the following is a specification.

This invention relates to baking-powders and preparations; and the object of the invention is to provide a baking-powder of the phosphatic type or order which will be more stable than other phosphatic baking-powders.

My invention consists in a baking-powder comprising pulverulent phosphatic material admixed with granular alkaline material, such as sodium carbonate or bicarbonate, and a suitable diluent.

As is well known to all who are familiar with the art, phosphoric-acid materials or acid phosphates when employed in baking preparations in a pulverulent condition have invariably been associated with gas-producing constituents in the form of alkaline carbonates or bicarbonates, also in a pulverulent condition. It is also well known that such preparations have been subject to certain disadvantages, which have greatly impaired their value and utility. These disadvantages have been chiefly as follows: A tendency upon ordinary exposure to the atmospheric moisture to absorb the same, and in consequence of the extreme intimacy of contact between the phosphoric-acid material and the alkaline carbonate or bicarbonate, both being finely pulverulent, to allow of chemical reaction and consequent deterioration of the powder by loss of its leavening strength. Even when this deterioration was moderate in degree the value of the powder was greatly impaired because of the uncertainty which always existed in reference to its leavening power and the proper amount to use in a given case. Another disadvantage possessed by such baking preparations was due to their undesirably-rapid rate of reaction in consequence of too-ready solubility of the constituents in the pulverulent condition in which they existed. In consequence of this fact a considerable proportion of the leavening-gas was evolved too soon to be of any avail in leavening the material with which it was to be admixed, thus necessitating the use of a greater amount of the powder than would have otherwise been necessary and as a result unnecessarily increasing the amount of residue left in the food as a result of the reaction of the constituents and increasing the cost of its use. Experiments have demonstrated that the deterioration of the phosphatic baking preparations was due less to the deliquescence of the phosphatic constituent than to the intimacy of the contact of the particles of the acid and alkaline materials and to the extreme readiness with which reaction occurred as a result of this intimate contact at great numbers of points in consequence of the finely-pulverulent character of the constituents. The remedy which I propose for these conditions—and herein lies my invention—is in the substitution for the pulverulent alkaline carbonate or bicarbonate heretofore usually employed of an alkaline carbonate or bicarbonate in a granular condition, the granular particles being practically uniform in size and substantially free from pulverulent material. This granular form of gas-producing carbonate or bicarbonate presents distinct and valuable characteristics as a constituent of phosphatic baking-powders in which the phosphatic constituent is in a pulverulent condition. It, by reason of the character of the granules, aids in the maintenance of interspaces between the particles of the various constituents, thus rendering the degree of intimacy of contact much less and greatly retarding or entirely preventing deterioration in quality and leavening strength. Such powders are found upon investigation to resist ordinary atmospheric exposure very completely, to possess as great a degree of stability of composition as the best grades of other powders, and to represent a most satisfactory form of phosphatic powder. Such powder containing a granular gas-producing agent thus associated with a pulverulent phosphatic material diminishes in a proper and highly-advantageous degree the too-ready solubility of the exclusively-pulverulent materials heretofore exclusively employed and renders the evolution of the carbonic-acid gas less rapid, and thus markedly increases the efficiency of the powder as practically employed, renders its use more economical, and leads to the production of notably less of the residue which such powders inevitably leave in the food.

Having thus described my invention, I claim as new and desire to secure by Letters Patent—

1. The baking-powder comprising pulverulent phosphatic material admixed with granular alkaline material, and a suitable diluent.

2. The baking-powder comprising pulverulent phosphatic material admixed with sodium carbonate or bicarbonate in the condition of coarse grains or crystals, and a suitable diluent.

3. The baking-powder comprising the pulverulent phosphatic and diluent materials admixed with sodium carbonate or bicarbonate in granular form, essentially free from pulverulent sodium carbonate or bicarbonate.

In testimony whereof I have hereunto set my hand, this 12th day of June, 1900, at Minneapolis, Minnesota.

PHILIP B. HUNT.

In presence of—
C. G. HAWLEY,
M. E. GOOLEY.